ELECTRICAL CIRCUITS EMPLOYING SUPERCONDUCTOR DEVICES

Filed Oct. 5, 1960

INVENTOR.
WILLIAM H. CHERRY
BY
John V. Regan
ATTORNEY

United States Patent Office 3,181,080
Patented Apr. 27, 1965

3,181,080

ELECTRICAL CIRCUITS EMPLOYING SUPERCONDUCTOR DEVICES

William H. Cherry, Princeton, N.J., assignor to Radio Corporation of America, a corporation of Delaware Filed Oct. 5, 1960, Ser. No. 60,602
7 Claims. (Cl. 330—61)

This invention relates to electrical circuits which depend for their operation on the controlled propagation of the interface between the normal and superconducting phases of a superconductor, and to a novel method of operating a superconductor as the control element of an amplifier, modulator, or the like.

Superconductivity and the general properties of superconducting materials are known in the art and described, for example, in the book "Superconductivity" by D. Shoenberg, published by the Cambridge University Press, 1951, and in other publications. It has been suggested that superconductors be used as control elements in amplifiers, modulators, and the like because of the physically small size and low noise factor characteristic of such elements. Electrical circuits employing superconductors have the further advantages of compatibility with other low temperature apparatus, such as cryogenic computer devices, and of large bandwidth made possible by the high speed switching capabilities of superconductors.

It is among the objects of this invention to provide:

Electrical circuits which depend for their operation upon the controlled propagation of interface between the superconducting and normal phases of a superconductor;

A novel method of operating a superconductor as a control element by controlling the propagation between the superconducting and normal phases of the superconductor.

These and other objects are accomplished according to the invention by the combination of a superconductive element; cooling means surrounding or in thermal contact with said element; means for establishing in the body of said element a region of normal resistance, the surface separating said normal region from the remainder of said element being termed an interface; means for generating joulean heat in said region of greater quantity than can be absorbed directly by said cooling means, the excess heat in part passing across said interface to the superconducting portion of said element; means for establishing different conditions for superconductivity along the length of said element; and means responsive to an input signal for permitting change of position or propagation of said interface.

In accordance with one embodiment of the invention, the superconductive element is a tapered body, and a field of graduated intensity is established by electrical current of graduated density flowing in the element, the graduated density being a consequence of the taper of the element.

In accordance with another embodiment of the invention, the field (magnetic or heat) of graduated intensity is established by means external to the element.

In the accompanying drawing, like reference characters refer to like components, and:

Figures 1, 2, 3, 4, 5:
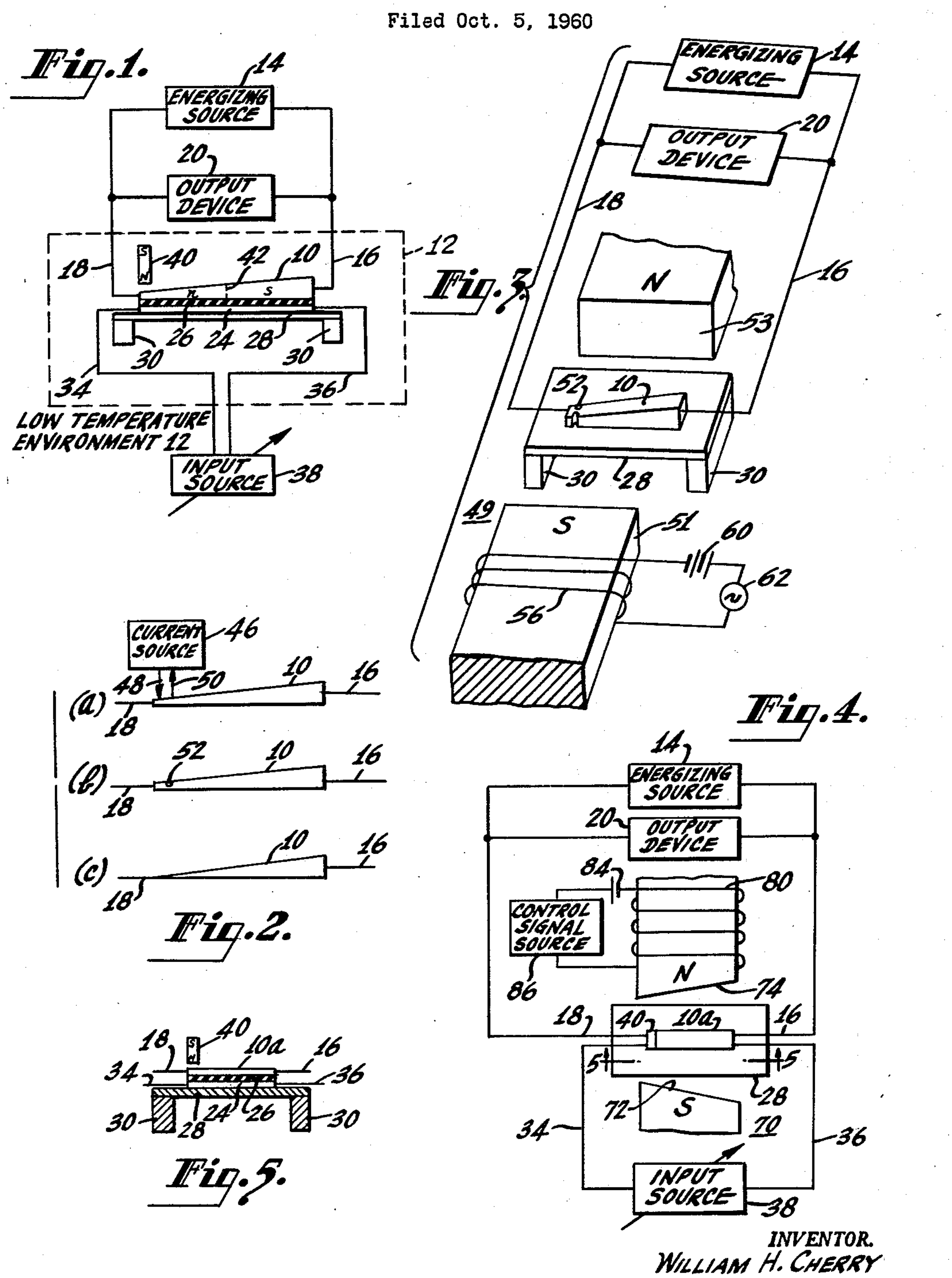
FIGURE 1 is an embodiment of the invention wherein the superconductive element is a tapered body, such as a wedge of solid material or an evaporated or chemically deposited film of graduated thickness or width, and wherein the temperature of the body is varied in response to an input signal.
FIGURE 2 is a diagrammatic view of three means for establishing an initial nucleation site of normal resistance in a superconductive element.
FIGURE 3 is another embodiment of the invention wherein the superconductive element is a tapered body, and wherein the magnetic intensity at the surface of the body is varied in response to an input signal.
FIGURE 4 is an embodiment of the invention wherein the field of graduated intensity is provided by a magnet, and wherein the temperature of the body may be varied in accordance with an input signal.
FIGURE 5 is a sectional view of the apparatus of FIGURE 4 taken along the line 5—5 thereof.

Certain materials below a critical temperature, which is characteristic of the material, can be either in the normal state or in the superconducting state. For bulk materials, those having dimensions of the order of a micron or more, the superconducting state, or phase, is characterized by so-called perfect diamagnetism as well as by zero electrical resistance which characterizes superconducting thin films. Superconductivity may be destroyed by immersing the superconducting material in a magnetic field which is greater than a certain critical value, the value being characteristic of the particular superconducting material and its temperature. A. B. Pippard, in an article in the "Philosophical Magazine," volume 41 at page 243, proposed a model for the growth of the normal phase at the expense of the superconducting phase in the presence of an externally generated magnetic field. This model takes into account the reaction of the eddy currents produced by the magnetic field as it propagates into the material along with the growing normal region and maintains the field strength at its critical value at the normal-to-superconducting interface.

Superconductivity may also be destroyed if a current is set up in the material which exceeds a certain critical value. Bulk cylindrical wires, for example, during transitions induced by currents in excess of the critical value, conform with what is said to be the Silsbee hypothesis which states that it is the magnetic field caused by the current at the surface of the wire which is responsible for the transition. One can infer from Pippard's model that in the case of current quenching in cylindrical wires, the normal phase nucleates at the outer surface and grows radially inward, followed by a regrowth of the superconducting regions into the intermediate state. According to the said theory, there would be no initial region of transition to the normal state unless the magnitude of the current exceeded that critical value which would produce, at the wire surface, the critical magnetic field of the superconducting material at the bath temperature. In that event, the initial region of transition would comprise the entire cylindrical surface layer of the wire.

However, it has been found that, under certain conditions to be described, the transition of a superconducting wire or strip of film to the phase of normal conduction, under the impact of a surge of current, is governed by a process of interface propagation entirely different from that proposed by the said Pippard theory. In this new process, after the formation of the normal phase in a small region of the wire, the interface moves outward into the bulk of the wire and sweeps along the wire to the ends thereof, in contradistinction to simultaneous transition throughout the length of the wire. The mechanism by which the initial, small nucleus of normal phase may be formed in the wire (thin film, etc.) will be described in detail hereinafter in connection with the description of the invention. The process of interface propagation under consideration occurs at lower values of current than the critical value already mentioned with respect to the Pippard theory and dominates the transition, relative to the mechanism suggested by Pippard, in some cases even precluding the formation of a final intermediate state. It will be apparent from the following discussion that the process of interface propagation appears not only in the case of a current surge, but in the case of a current which reaches a steady state value.

Ohmic or joule heat is generated in the normal region as a result of the current flow therethrough. Much of this heat flows radially outward to the bath, but some of the heat flows across the interface from the normal region into the superconducting region just beyond the interface. Even at currents considerably less than the critical value suggested by the Pippard-Silsbee theory, this heating of the superconducting region can be sufficient, aided to some more or less small degree by the magnetic field of the current, to cause the superconducting material next to the interface to go normal. This moves or drives the interface along the wire away from the pre-existing normal region. As the normal region grows, new sources of ohmic heat are created behind the interface and cause further propagation of the interface.

The velocity of the interface propagation is such that the boundary temperature at the interface is equal to the transition temperature, and the transition temperature under these circumstances is higher than that of the bath because of the joule heating. Of course, the transition temperature is a function of the surface magnetic field produced by the current and, also, of any externally applied field, but the principal mechanism by which the interface is propagated is ohmic or joule heating, and not electrodynamic in nature, such as relating to eddy current or electromagnetic wave effects.

The velocity of propagation of the interface along the wire has been found to depend on certain well-defined parameters, some of which are easily controlled. One such parameter is the magnitude of the current surge; another parameter is the temperature of the bath; still another such parameter is the magnetic field intensity at the wire surface. The interface velocity is a function of the ratio $I^2/(T_t-T_b)$, where I is the current through the wire, $T_t$ is the transition temperature, and $T_b$ is the bath temperature. By suitably adjusting the above parameters, the velocity of the interface may be raised or lowered, brought to zero, or even reversed. This last condition implies that the transition of phase is reversed, that is, the normal region is becoming superconducting. Bringing the velocity to zero implies that an exact balance is struck between the various factors of heating and cooling. If the current is so large that the corresponding $T_t$ becomes less than $T_b$, the transition changes character and appears to occur simultaneously over the entire wire, presumably taking a form similar to that proposed by Pippard.

In accordance with the present invention, propagation is controlled, and the location of the interface stabilized, by the introduction of a taper, gradient, or nonuniform field of current density, heating or magnetic field. The interface may then be controllably displaced by a change in any of the parameters aforementioned in response to an input signal. Inasmuch as the resistance of the partially superconducting element is a function of the interface location, the resistance varies in accordance with the input signal. Amplified signals may be derived by suitable circuit connection to the superconductor. Modulation of one input signal by another may be obtained by varying one or more of the parameters in accordance with the two signals.

One embodiment of the present invention is illustrated diagrammatically in FIGURE 1. The superconductor element is a wedge-shaped or tapered member 10 having, for simplicity of discussion, uniform thickness or width throughout in a direction normal to the plane of the drawing. The material content of the element 10 preferably is one having a low thermal capacity and, for this reason, a thin film is preferred, although other forms of materials also may be used. A substance convenient from the standpoint of easy manufacture into thin films, and one with convenient electrical properties and superconducting transition temperature, is tin, although many other materials, tantalum for example, are also suitable. The superconductive element 10 is enclosed within a low temperature environment, indicated schematically by the dashed box 12. The dashed box 12 may be, for example, a liquid helium cryostat or other suitable means for cooling the element 10 below the critical temperature at which the element 10 normally becomes superconducting. Various means for cooling the element 10 are described in an article entitled "Low Temperature Electronics" in the Proceedings of the IRE, volume 42, pages 408, 412, February 1954, and in other publications.

An energizing source 14 supplies current to the element 10 by way of leads 16, 18 connected near opposite ends of the element 10. An output device 20, responsive either to changes in resistance of the element 10 or to changes in voltage thereacross, is connected between the leads 16, 18. Alternatively, the output device 20 may be connected by way of separate leads (not shown) to other points on the element 10.

A heating element 24, which may be a thin film of gold or other resistive material, is positioned parallel to the bottom surface of the element 10 and separated therefrom by a thin layer 26 of electrical insulating material, such as silicon monoxide. The apparatus may be supported in the low temperature environment 12 by a substrate structure 28, made of glass or other rigid material, or where a low heat capacity substrate is desired, made of a thin film such as aluminum oxide, which is itself supported and protected by a rigid framework 30 of tetrafluoroethylene polymer. The gold film 24 is heated by current supplied over leads 34, 36 from an input source 38. This latter current flowing through the heater 24 varies in response to a signal at the input source 38. This feature is illustrated schematically by the arrow at the input source 38, indicating that source 38 is a variable current source. The source 38, as will be apparent from a later discussion, may also include a direct current (D.C.) biasing means which furnishes a predetermined heater current in the quiescent condition, that is, in the absence of an input signal.

The apparatus within the dashed box 12 may be constructed as follows. A thin film, nonsuperconductive gold strip 24 of uniform thickness is evaporated on a substratum of supporting material 28, which may be aluminum oxide. The substratum 28 is made as thin as possible in order to provide the shortest thermal time constant. Gold is preferred as the heater strip 24 because it is easy to evaporate, does not easily peel off, and has a linear resistivity versus temperature characteristic. On top of the heater film 24 is evaporated a thin film 26 of silicon monoxide or other electrical insulating material. The superconductive material 10 is then evaporated on top of the insulating strip 26, the superconductor 10 being tapered or wedge-shaped along its length. The taper can be achieved by off-center or nonorthogonal evaporation, or by means of moving masks, particularly if a nonlinear taper is desired.

An initial, small nucleation site of normal phase is provided in the FIGURE 1 embodiment in response to the magnetic field from a small bar magnet 40. This magnet 40 is positioned near the narrow end of the element 10. When current from the energizing source 14 is then supplied to the element 10, ohmic or joulean heat is generated in the region of normal phase.

The current in the normal region of the element 10 is uniformly distributed in any cross-sectional area thereof, but the current density varies along the length of the normal region because of the taper. The current shifts from a uniform distribution in the normal region to a surface concentration in the superconducting region in the vicinity of the interface. Extending through the region of current shift there are large radial variations of current density and, consequently, more joulean heating than in the bulk of the normal region.

The magnitude of the current supplied by the energizing source is selected such that more joulean heat is generated in the initially created normal region than can flow directly to the surrounding bath. The excess heat flows across the interface and raises the temperature of that portion of the superconducting region adjacent the interface to the transition temperature, causing the interface to propagate to the right.

If the element 10 were of constant-cross-sectional area, the interface would continue to propagate the entire length of the element 10. However, because of the taper, the density of current distribution in the normal region, and hence the amount of joulean heat generated in any small length of the element 10 decreases from letf to right. The interface propagates, by joulean heat, until the heat flowing across the interface is insufficient to raise the temperature of the superconducting region to the temperature required for further transition. The interface then reaches zero velocity. This, then, is the stable equilibrium position of the interface in the quiescent condition. The temperature in the superconducting region near the interface is higher than the bath temperature. Possibly there may be local regions in the intermediate state near the interface at this time, but this does not affect the general operation of the device. The position of the interface in the quiescent condition may be as indicated in FIGURE 1 by the reference character 42.

The interface may be displaced from its quiescent equilibrium position 42 by varying any of the parameters discussed previously. In particular, the interface may be controllably displaced by changing either the temperature of the element 10 or the temperature of the bath, or by altering the magnetic field intensity at the surface of the element 10. The FIGURE 1 apparatus may be operated either as an amplifier or as a modulator, depending upon the particular forces active to alter any of the parameters.

Consider now the operation of the apparatus as an amplifier. The energizing source 14 supplies a constant D.C. current to the element 10. The energizing source 14 may be any suitable constant current source, for example, a pentode tube circuit. The input source 38 supplies current to the heater 24 in proportion to the amplitude of signals to be amplified.

The temperature of the heater 24 is a function of the amplitude of current flow therethrough, and is independent of the direction of this current flow. In order to obtain true amplification of A.C. input signals, therefore, it is necessary to provide a reference current for the heater 24 in the quiescent condition so that the temperature of the heater 24 may be alternately raised and lowered in response to A.C. signals. The input source 38 may include a D.C. source such as a battery for this purpose. It will be understood that the heat generated by the quiescent current through the heater 24 determines, in part, the quiescent equilibrium position of the interface.

The heat given off by the heater 24 warms the element 10 and, to some extent, the surrounding bath. As more heat is given off by the heater 24 in response to an input signal of one polarity, the temperature of the element 10 is raised. The additional heat from the heater 24 combines with the heat passed across the interface from the normal region of element 10 to raise the temperature of the superconducting region near the interface to the transition temperature, whereby the interface propagates to the right. The amount of propagation is in proportion to the amount of additional heat supplied by the heater 24 and is, therefore, proportional to the input signal current.

The temperature of the heater 24 is lowered in response to signals of the opposite polarity and proportionately less heat is then supplied by the heater 24. The interface then transits to the left, that is, a portion of the normal region becomes superconducting. Again, the amount of displacement is in proportion to the change in heat supplied by the heater 24 and is, thus, proportional to the input signal current.

The resistance of the element 10 is a function of the position of the interface. The voltage developed across the element 10 is also proportional to the position of the interface because of the constant current flowing through the element 10. Changes in voltage due to the displacement of the interface are detected by the high impedance output device 20, and the output is an amplified replica of the input signal. Amplification increases as the angle of taper decreases. However, the stability of the interface increases as the angle of taper increases. It is necessary, therefore, to strike a balance between the factors of stability and amplification. Although the element 10 is illustrated as having a linear taper, it will be apparent to one skilled in the art that the taper need not be linear and that various degrees of nonlinear amplification may be obtained by suitable element 10 geometry. The apparatus may even be used as a function generator.

Consider now the operation of the apparatus as a modulator. Current in proportion to a first of two signals is supplied by the input source 38 to the heater 24, as described above. The second signal source may be included in the energizing source 14 such that the second signal is superimposed on the quiescent current flowing through the element 10. The effect of the heater current 24 is as described above in the description of the amplifier. Variation of the element 10 current in response to a varying current from the energizing source 14 affects the amount of joulean heat generated in the normal region of the element 10 and also affects the magnetic field at the surface of the superconducting region. Consider the effect of the element 10 current acting alone: more current generates more joulean heat, thereby causing propagation of the interface to the right, as viewed in the drawing; less element 10 current generates less joulean heat in the normal region, causing propagation of the interface to the left. The effects produced by the varying current in element 10 and the varying heater 24 current interact to produce modulation of one signal by the other.

Three other means for producing the initial small nucleation site in the element 10 are illustrated diagrammatically in FIGURE 2. In FIGURE 2(*a*) current source 46 is connected by way of leads 48, 50 to two points near the narrow end of the tapered element 10. The source 46 provides current in the portion of the element 10, between the contacts, to set up a magnetic field of sufficient intensity or by other current density effects to cause that portion of the element 10 to transit to the normal state.

In the embodiment of FIGURE 2(*b*) a notch 52 or slot is cut in the element 10 near the narrow end. Current from the energizing source 14 (FIGURE 1) must flow over the limited surface area at the location of the notch 52. The surface current density is high at this location and of sufficient magnitude to provide a magnetic field greater than the critical value for breakdown or to otherwise quench the superconductivity. When the restricted portion of the element 10 goes normal, joulean heat developed therein by the current from the energizing source 14 causes the interface to propagate in the manner already described until an equilibrium point is reached.

In the FIGURE 2(*c*) embodiment the element 10 tapers down to a very small cross-sectional area at the left-hand end. The current density is very great at this narrow end and the resulting magnetic field exceeds the critical breakdown value. When a portion at the narrow end of the element 10 goes normal, joulean heat is created therein and the interface propagates to the right, due to the joulean heat, until equilibrium is established. If the notching or thinning at one end is carried out in a dimension perpendicular to the plane of FIGURE 2, or if the current from source 46 is applied in this dimension, equivalent or even better nucleation will be accomplished and in the same manner as just described. A change in the composition of the material of element 10 in this region can have a similar nucleation effect.

Another embodiment of the present invention is illustrated diagrammatically in FIGURE 3. In FIGURE 3, an electromagnet 49 (illustrated in partial view) having pole pieces 51, 53 takes the place of the heater element 24 of FIGURE 1. The wedge-shaped thin film superconductive element 10 is supported directly by a thin film 28 of aluminum oxide. The pole pieces 51, 53 are parallel to each other and to the front and rear surfaces or edge faces of the element 10. A uniform magnetic field is thereby provided along the length of the element 10 by the magnet 49. For illustrative purposes, the element 10 is illustrated as having a notch 52 near the narrow end thereof and is, therefore, an alternative of the type illustrated in FIGURE 2(*b*).

Current is supplied to the element 10 from an energizing source 14, and an output device 20 is connected across the element 10. A winding 56 links the magnet 49. A D.C. energizing source, illustrated as a battery 60, and an input signal source 62 are serially connected with the winding 56. The battery 60 supplies a quiescent current to the winding 56 to establish a reference field. It may be omitted if suitable permanent magnet material is part of the magnet. This field adds vectorially to the magnetic field created by the current flowing in the element 10.

The FIGURE 3 device may be operated, for example, as an amplifier or modulator. For operation as an amplifier, the energizing source 14 supplies constant current to the element 10. An initial region of normal resistance is created by this current in a manner described above with respect to FIGURE 2(*b*). The interface between the normal and superconducting regions, once established, propagates to the right, as viewed in the drawing, due to the joulean heat passed across the interface to the superconducting region. A point of equilibrium is reached for the conditions of magnetic field created by the current flow and the magnet 49 and the balance of heat flow and transition temperature. The interface stabilizes at this point.

Signals to be amplified are provided by the source 62 in the input circuit. A current proportional to the input signals is superimposed on the bias current supplied by the battery 60, and the magnetic field created by the magnet varies in proportion to the amplitude of the input signals. The interface propagates either to the right or to the left as the magnetic field is either raised or lowered, respectively, because the magnetic field, in affecting the transition temperature of the material, changes the requirement of heat flow into the superconducting region to reach that temperature.

For operation as a modulator, the energizing source 14 supplies a varying current to the superconductive element 10. The current variation is in proportion to the amplitude of input signals supplied by a first source, which may be included in the block labeled "energizing source 14." The second signal source is the source 62 described above. The interface propagates to the right as more current is supplied by the source 14; the interface propagates to the left when less current is supplied by the source 14. The effects of varying the element 10 current and the current through winding 56 interact to provide modulation of one signal by the other. The element 10, illustrated as having a linear taper, may alternatively have a different geometrical configuration, whereby preselected functions of the input signals may be derived. Whatever the particular configuration, however, the current supplied to the element 10 is of such magnitude that transition from the normal phase to the superconducting phase, or vice versa, in the element 10, takes place by interface propagation caused by joulean heat.

Another embodiment of the invention is illustrated, partially in plan view and partially in block form, in FIGURE 4. A view in elevation of the superconductive element **10*a* and components beneath element 10*a* is illustrated in FIGURE 5. This embodiment of the invention will be described with reference to both FIGURE 4 and FIGURE 5. The superconductive element 10*a* may be a wire or thin film having uniform dimensions throughout the length thereof. A magnet 70 having nonparallel pole pieces 72, 74 provides a graduated magnetic field to take the functional place of the taper of the superconductive element 10 (FIGURE 1). The element 10*a* is positioned between the pole pieces 72, 74 of the magnet 70 such that the axis or long direction of element 10*a*** is along a line of graduated magnetic field intensity.

The magnetic field provided by the magnet 70 decreases in intensity from left to right along the length of the element **10*a*. Accordingly, quenching of the superconductivity of element 10*a* occurs at a higher temperature at the right than at the left of the element 10*a*. A small magnet 40, if needed, may be used to provide a magnetic field of sufficient intensity to form an initial small nucleus of resistance in the left end of the element 10*a*. Current from the energizing source 14** generates joulean heat in this normal region and causes the interface to propagate to the right according to the same general principles already discussed. In this case, the intensity of joule heating does not depend on position along the element, and still the interface propagates until the heat supplied across the interface is sufficient to heat the superconducting region to the transition temperature. This is because the transition temperature, as previously stated, increases from left to right in accordance with the effect of the magnetic field gradient.

Operation of the FIGURE 4 embodiment is generally similar to that of the other embodiments already described and will not be described in detail. Signals to be amplified are supplied to the heater 24 by the input source 38, which also may supply a quiescent or reference current. Further possibilities of modulation, analog multiplication, etc. are possible by linking the magnet 70 with a winding 80. A battery 84 and a signal source 86 may be connected in series with the winding 80 and provide further means for effecting propagation of the interface. It is believed apparent to one skilled in the art that the graduated magnetic field in FIGURE 4 may be replaced by a graduated heat field. Moreover, it is obvious that combinations of pluralities of heater and/or magnetic control elements as exemplified in FIGURES 1 through 5, can be used to perform more complex amplification, intermodulation and function generation processes.

There have been shown and described above various embodiments for amplifying signals, modulating one signal by another, and for providing various degrees of nonlinear amplification. There has also been described a novel method for operating a superconductor as a control element. In all of the illustrated embodiments, joulean heat is the primary mechanism for causing transition of the superconductive element between the normal and superconducting phases.

What is claimed is:

1. In combination with an element of superconductive material immersed in a cooling medium having a temperature lower than the critical temperature of said material; means for forming an initial region of normal resistance in said element separated from the superconductive portion by an interface; means for generating sufficient heat in said initial region to raise the temperature of said superconductive portion to the transition temperature, whereby said interface propagates due to heating; means for producing a field of graduated intensity along the surface of said element to stabilize said interface at an equilibrium position in the quiescent condition; and means responsive to an input signal for permitting further propagation motion of said interface proportional to said signal.

2. The combination comprising: an element of superconductive material; a cooling medium for said element having a temperature lower than the critical temperature of said material; means for establishing an initial region of normal resistance in said element separated from the superconducting region by an interface; means for supplying current to said element of such magnitude that sufficient ohmic heat is passed across said interface to raise the adjacent portions of said superconducting region to the transition temperature; means providing a field of graduated intensity along the surface of said superconducting region, whereby said interface reaches a stable equilibrium position in the quiescent state; and means responsive to an input signal for changing the requirements for stability of said interface.

3. The combination comprising: an element of superconductive material; a cooling medium for said element having a temperature lower than the critical temperature of said material; means for forming an initial region of normal resistance in said element separated from the superconducting region by an interface; means for generating sufficient heat in said initial region to raise the portion of said superconducting region adjacent said interface to the transition temperature, whereby said interface propagates; means for producing a field of graduated intensity along the surface of said element to stabilize said interface in the quiescent condition; and heat supply means responsive to an input signal for warming said element an amount proportional to said input signal.

4. The combination comprising: an elongated element of superconductive material having a nonuniform cross-sectional area; cooling means for said element having a temperature lower than the critical temperature of said material; means for forming an initial region of normal resistance in said element separated from the superconducting portion by an interface; means for supplying current to said element of such magnitude that the resulting $I^2R$ heat generated in said initial region warms the portion of said superconducting region adjacent said interface to the transition temperature and causes said interface to propagate, said current also creating a magnetic field or graduated intensity along the length of said element, whereby said interface reaches a stable position in the quiescent condition; and means responsive to an input signal for changing the requirements for stability of said interface.

5. The combination comprising: an elongated element of superconductive material having a nonuniform cross-sectional area; cooling means for said element having a temperature lower than the critical temperature of said material; means for forming an initial region of normal resistance in said element separated from the superconducting portion by an interface; means for supplying current to said element of such magnitude that the resulting $I^2R$ heat generated in said initial region warms the portion of said superconducting region adjacent said interface to the transition temperature and causes said interface to propagate, said current also creating a magnetic field of graduated intensity along the length of said element, whereby said interface reaches a stable position in the quiescent condition; and heat supply means responsive to an input signal for warming said element an amount proportional to said input signal.

6. The combination comprising: an element of superconductive material; a cooling medium for said element having a temperature lower than the critical temperature of said material; means for forming an initial region of normal resistance in said element; means for generating ohmic heat in said region of sufficient quantity to warm adjacent superconducting portions above the temperature of said cooling medium; means for establishing different conditions for superconductivity along one direction of said element; and means responsive to an input signal for changing said conditions.

7. An electrical circuit comprising: an element of superconductive material; a cooling medium for said element having a temperature lower than the critical temperature of said material; means for forming an initial region of normal resistance in said element; means for supplying a bias current to said element for generating ohmic heat in said region of sufficient quantity to warm adjacent superconducting portions above the temperature of said cooling medium; means for establishing different conditions for superconductivity along one direction of said element; first means responsive to input signals from a first source for changing said conditions; and second means responsive to input signals from a second source for varying the current supplied to said element.

References Cited by the Examiner

UNITED STATES PATENTS

| | | | |
|---|---|---|---|
| 2,914,735 | 11/59 | Young | 340—173 |
| 2,924,814 | 2/60 | Simpson | 340—173 |
| 2,984,825 | 5/61 | Fuller et al. | 340—174 |
| 3,021,433 | 2/62 | Morrison | 307—88.5 X |
| 3,059,196 | 10/62 | Lentz | 307—88.5 X |
| 3,061,738 | 10/62 | Wilson | 307—88.5 X |

OTHER REFERENCES

Garwin: Article, "An Analysis of the Operation of a Persistent, Supercurrent Memory Cell," IBM Journal, October 1957, pp. 304–308.

Kraus: "IBM Technical Disclosure Bulletin," vol. 2, No. 4, Dec. 1959, page 132.

ROY LAKE, *Primary Examiner.*

BENNETT G. MILLER, NATHAN KAUFMAN, *Examiners.*